Patented Jan. 6, 1948

UNITED STATES PATENT OFFICE 2,434,150

MONOAZO COMPOUNDS

Joseph B. Dickey and James G. McNally, Rochester, N. Y., assignors to Eastman Kodak Company, Rochester, N. Y., a corporation of New Jersey No Drawing. Application November 16, 1942, Serial No. 465,690

6 Claims. (Cl. 260—152)

This invention or discovery relates to new azo compounds and their application to the art of dyeing or coloring.

It is an object of our invention to provide new azo compounds highly useful as dyes. A further object of our invention is to provide non-vegetable textile material colored with the new azo compounds of our invention. Another object is to provide a satisfactory process for the preparation of the new azo compounds of our invention. A further object is to provide organic derivative of cellulose textile material colored with the new azo compounds of the invention. A particular object is to provide cellulose acetate textile material colored with the new azo compounds of the invention.

Typical organic derivatives of cellulose include the hydrolyzed as well as the unhydrolyzed cellulose organic acid esters such as cellulose acetate, cellulose formate, cellulose propionate or cellulose butyrate, and the hydrolyzed as well as the unhydrolyzed mixed organic acid esters of cellulose, such as cellulose acetate-propionate, cellulose acetate-butyrate, and the cellulose ethers, such as methyl cellulose, ethyl cellulose or benzyl cellulose.

The new azo compounds of our invention, by means of which the above objects are accomplished or made possible have the formula:

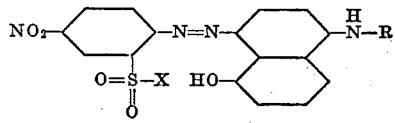

wherein X stands for a member selected from the group consisting of an open chain aliphatic group and a tetrahydrofurfuryl group and R stands for a member selected from the group consisting of a 2,3-dihydroxy-n-propyl group and a 2,3-dihydroxy-2-methyl-n-propyl group. Insofar, at least, as the dyeing of cellulose acetate is concerned, X is advantageously the methyl group.

When X is "an open chain aliphatic group" it can be an alkyl group such as methyl, ethyl, propyl or butyl or a group such as β-hydroxyethyl, β-methoxyethyl, β-othoxyethyl, methoxymethyl, cyanomethyl,

—CH$_2$COOCH$_3$, —CH$_2$COOC$_2$H$_5$, —CH$_2$CONH$_2$

β-ketopropyl or —CH$_2$CH$_2$N(CH$_3$)$_2$. Similarly, when X is "a tetrahydrofurfuryl group" it can be tetrahydrofurfuryl, 5-methyltetrahydrofurfuryl or 5-β-hydroxyethyltetrahydrofurfuryl, for example.

The azo dye compounds of our invention yield greenish-blue colors. They are particularly of value for the dyeing of organic derivative of cellulose textile materials, especially cellulose acetate textile materials. They can also be used to color other non-vegetable textile materials such as silk, wool and nylon. Cellulose ester and cellulose ether lacquers as well as lacquers from vinyl derivatives also can be colored.

The colorations yielded by the new azo compounds of our invention on cellulose acetate, for example, are of good to excellent light fastness. These colorations likewise possess increased resistance to burnt gas fumes and possess the important property of being dischargeable to a clear white with discharging agents such as sodium hydrosulfite and sodium formaldehyde sulfoxylate. Further, these new azo compounds possess good affinity for the textile materials named herein and dye them rapidly.

We are aware that Felix et al. U. S. Patent 2,053,818, issued September 8, 1936, discloses the azo dyes having the formula:

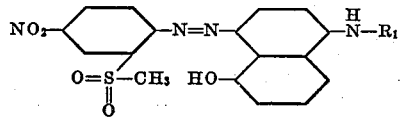

wherein R$_1$ is methyl, allyl or hydroxyethyl. However, the dye compounds of our invention are much more fast to light, approximately 100% more, than the corresponding dyes of the Felix et al. patent. This unexpected and important discovery could not have been predicted. Further, the dye compounds of our invention dye somewhat more rapidly and are more resistant to burnt gas fumes.

The new azo compounds of our invention can be prepared by diazotizing arylamines having the formula:

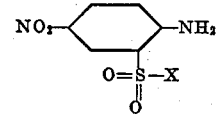

wherein X has the meaning previously assigned to it and coupling the diazonium compounds obtained with the compounds having the formula:

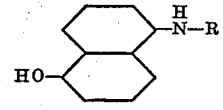

wherein R has the meaning previously assigned to it. Coupling should be carried out in an acid medium to prevent possible coupling in ortho or para position to the hydroxy group.

The following examples illustrate the preparation of the azo compounds of the invention:

EXAMPLE 1

21.6 grams of 5-nitro-2-aminophenylmethylsulfone are diazotized in acetic acid with nitrosyl sulfuric acid. Any excess nitrous acid present after the diazotization reaction is destroyed by adding urea following which the reaction mixture is poured onto an ice and water mixture to effect proper dilution of the reaction mixture. Throughout the diazotization reaction it will be understood that the reaction mixture is maintained in a cooled condition such as 0-5° C. by external cooling.

The diazonium solution prepared as described above is added with stirring to an iced solution of 23.3 gram moles of 1-(2,3-dihydroxy-n-propylamino)-5-hydroxynaphthalene in dilute hydrochloric acid. This solution can be obtained by dissolving the hydrochloride salt form of 1-(2,3-dihydroxy-n-propylamino)-5-hydroxynaphthalene in water. Throughout the coupling reaction which takes place, the reaction mixture is maintained at a temperature of 0-10° C. The coupling reaction is completed by adding sodium acetate to the reaction mixture until it is neutral to Congo red paper and letting it stand for awhile. The dye compound is recovered by filtration, washed with water and dried. The dye compound obtained has the formula:

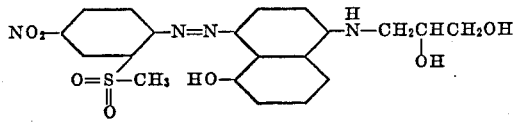

It colors cellulose acetate greenish-blue shades which are fast to light and which are easily dischargeable to a pure white.

EXAMPLE 2

21.6 grams of 5-nitro-2-aminophenylmethylsulfone are diazotized as described in Example 1 and the diazonium solution obtained is coupled with 24.7 grams of 1-(2,3-dihydroxy-2-methyl-n-propylamino)-5-hydroxynaphthalene. Coupling and recovery of the dye compound formed can be carried out in accordance with the procedure described in Example 1. The dye compound obtained has the formula:

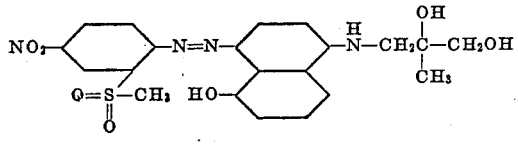

It colors cellulose acetate greenish-blue shades which are fast to light and which are easily discharged to a pure white.

EXAMPLE 3

26 grams of 5-nitro-2-aminophenyl-β-methoxyethylsulfone are diazotized in accordance with the procedure described in Example 1 and the diazonium compound obtained is coupled with 23.3 grams of 1-(2,3-dihydroxy-n-propylamino)-5-hydroxynaphthalene. Coupling and recovery of the dye compound formed can be carried out in accordance with the procedure described in Example 1. The dye compound obtained has the formula:

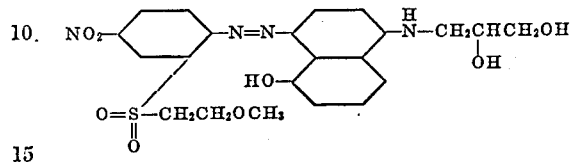

It colors cellulose acetate greenish-blue shades which are fast to light and which are easily discharged to a pure white.

EXAMPLE 4

27.8 grams of 2-amino-5-nitrophenyltetrahydrofurfurylsulfone are diazotized in accordance with the procedure described in Example 1 and the diazonium compound obtained is coupled with 23.3 grams of 1-(2,3-dihydroxy-n-propylamino)-5-hydroxynaphthalene. The coupling and recovery operations can be carried out in accordance with the procedure described in Example 1. The dye compound obtained has the formula:

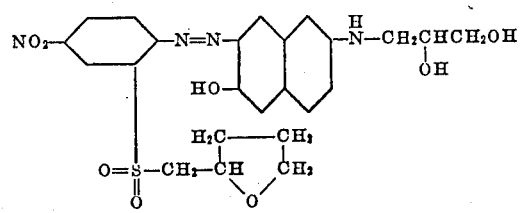

It colors cellulose acetate greenish-blue shades which are fast to light and which are readily dischargeable to a pure white.

The following tabulation further illustrates the compounds included within the scope of our invention. The compounds indicated below may be prepared by diazotizing the amines listed under the heading "Amine" and coupling the diazonium compounds obtained with the compounds specified in the column entitled "Coupling component." The diazotization and coupling reactions may be carried out following the procedure described in Example 1. The color given is that yielded by the dye on the materials which, as hereinbefore indicated, it is adapted to color.

| Amine | Coupling Component | Color |
|---|---|---|
| 2-amino-5-nitrophenyl-ethylsulfone | (1) 1-(2,3-dihydroxy-n-propylamino)-5-hydroxynaphthalene. | greenish-blue. |
| Do | (2) 1-(2,3-dihydroxy-2-methyl-n-propylamino)-5-hydroxynaphthalene. | Do. |
| 2-amino-5-nitrophenyl-propylsulfone | 1-2 above | Do. |
| 2-amino-5-nitrophenyl-β-hydroxyethylsulfone | do | Do. |
| 2-amino-5-nitrophenyl-β-methoxyethylsulfone | do | Do. |
| 2-amino-5-nitrophenyl-ω-methoxymethylsulfone | do | Do. |
| 2-amino-5-nitrophenyl-ω-cyanomethylsulfone | do | Do. |
| 2-amino-5-nitrophenyl-ω-carboxymethylsulfone | do | Do. |
| 2-amino-5-nitrophenyl-(CH$_2$CONH$_2$)-sulfone | do | Do. |
| 2-amino-5-nitrophenyl-(CH$_2$COOCH$_3$)-sulfone | do | Do. |
| 2-amino-5-nitrophenyl-(CH$_2$COOC$_2$H$_5$)-sulfone | do | Do. |
| 2-amino-5-nitrophenyl-β-ketopropylsulfone | do | Do. |
| 2-amino-5-nitrophenyl-5-β-hydroxyethyltetrahydro-furfurylsulfone | do | |
| 2-amino-5-nitrophenyl-5-methyltetrahydro-furfurylsulfone | do | Do. |

In order that the preparation of the compounds of our invention may be entirely clear, the preparation of the intermediates used in their manufacture is indicated hereinafter. Aromatic amines having the formula:

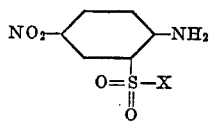

can be prepared by mononitrating compounds having the formula:

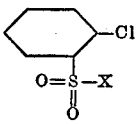

to obtain the compounds having the formula:

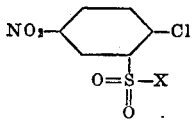

which, in turn, are aminated to yield the desired compounds. The series of reactions mentioned will be illustrated in connection with the preparation of 2-amino - 5 - nitrophenyl - β - methoxyethylsulfone. X in the formulae just given has the meaning previously assigned to it.

*Preparation of 2-chlorophenyl-β-methoxyethylsulfone*

20 grams of the sodium salt form of o-chlorophenylsulfinic acid and 13.9 grams of mono-β-methoxyethylbromide (BrCH₂CH₂OCH₃) are placed in a suitable reaction vessel and heated on a water bath for six hours. Following this, the reaction mixture is heated to the boiling point for two to three hours. The reaction mixture, upon cooling, is poured into water and the o-chlorophenyl-β-methoxyethylsulfone formed in the reaction, which precipitates upon pouring the reaction mixture into water, is recovered by filtration. This compound is then subjected to nitration as described hereinafter to form 2-chloro-5-nitrophenyl-β-methoxyethylsulfone.

*Preparation of 2-chloro-5-nitrophenyl-β-methoxyethylsulfone*

43 grams of concentrated sulfuric acid are placed in a 100 cc. three-necked, round bottom flask fitted with a mechanical stirrer and thermometer and the flask is then cooled to 0–5° C. by placing it in an ice bath. Six grams of o-chlorophenyl-β-methoxyethylsulfone are added portionwise to the sulfuric acid with stirring. A mixture of 2.0 grams of fuming nitric acid and 5 grams of concentrated sulfuric acid is then added dropwise during about ½ hour with stirring at 0–4° C. The reaction mixture is then stirred for approximately ½ hour longer while permitting the temperature to rise to 12° C. The reaction mixture is then poured onto ice, stirred and the precipitated 2-chloro-5-nitrophenyl-β-methoxyethylsulfone formed in the reaction is recovered by filtration, washed with water and dried. A good yield of a white crystalline quite pure compound is obtained.

*Preparation of 2-amino-5-nitrophenyl-β-methoxyethylsulfone*

23.6 grams of 2-chloro-5-nitrophenyl-β-methoxyethylsulfone are charged into a shaking autoclave together with 1 gram mole of concentrated ammonia water and the reaction mixture is heated at 150° C. for six hours. Upon cooling, the reaction mixture is filtered to recover the desired product which is purified by washing with water and then dried.

Compounds wherein the member X of the formula:

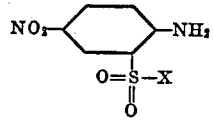

is methyl, ethyl, propyl, β-hydroxyethyl, ω-methoxymethyl, ω-cyanomethyl, —CH₂COOH, —CH₂COOCH₃, —CH₂COOC₂H₅,

β-ketopropyl, tetrahydrofurfuryl, 5-methyltetrahydrofurfuryl or 5-β-hydroxyethyltetrahydrofurfuryl can be prepared by substituting methyl bromide, ethyl bromide, 1-bromo-n-propane, ethylene chlorohydrin, monobromomethyl ether, monobromoacetonitrile, monochloroacetic acid, ClCH₂COOCH₃, ClCH₂COOC₂H₅,

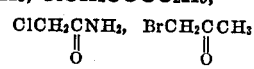

monochlorotetrahydrofurfural, monochloro - 5 - methyltetrahydrofurfural and monochloro-5-β-hydroxyethyltetrahydrofurfural, respectively, for the β-methoxyethylbromide in the first of the reactions described above. It will be understood, of course, that the compounds obtained are then mononitrated and the mononitro compounds are, in turn, aminated to give the desired product.

1- (2,3 - dihydroxy-n-propylamino) -5-hydroxynaphthalene and 1-(2,3-dihydroxy-2-methyl-n-propylamino)-5-hydroxynaphthalene can be prepared as follows:

*Preparation of 1-(2,3-dihydroxy-n-propylamino)-5-hydroxynaphthalene*

149 grams of 1-amino-5-naphthol are placed in a one-liter flask fitted with a mechanical stirrer, a gas inlet tube and a gas outlet tube. To the flask is then added 92.5 grams of sodium bicarbonate, 121 grams of glycerolchlorohydrin and 200 cc. of amyl alcohol. The reaction mixture is heated to boiling for 5 hours and during the reaction an inert gas such as nitrogen or carbon dioxide is bubbled through the reaction mixture. The dark reaction mixture is then poured into water and made acid to litmus with hydrochloric acid. Amyl alcohol is separated from the reaction mixture and the reaction product is dissolved by heating, treated with activated charcoal, filtered and allowed to crystallize by cooling. By this procedure the desired product is obtained quite purely in the form of its hydrochloride salt. The hydrochloride salt form is prepared because it is much more stable to air than the free base form. If desired, the sulfate salt form can be obtained by substituting sulfuric acid for hydrochloric acid in the above procedure. Should the free base form be desired for any reason, it can be obtained by neutralizing the acid salt form with sodium bisulfite, for example.

*Preparation of 1-(2,3-dihydroxy-2-methyl-n-propylamino)-5-hydroxynaphthalene*

This compound can be prepared following the procedure described in connection with the preparation of 1-(2,3-dihydroxy-n-propylamino)-5-hydroxynaphthalene by substituting 1 gram mole of mono-β-methylglycerylchlorohydrin for glycerylchlorohydrin.

The new monoazo dye compounds of our invention can be applied to cellulose acetate textile materials by the well known dispersion method. In this method the dye and soap or other suitable dispersing agent in finely divided uniform admixture are mixed with water to form a dyebath in which the material to be dyed is immersed, the dyeing operation being carried out at a suitable temperature until complete. This method of dyeing is so familiar to those skilled in the art to which this invention is directed that any further discussion of it is unnecessary. It is described more fully in our U. S. Patent 2,108,824, issued February 22, 1938. Somewhat lower temperatures than mentioned in the patent can be employed.

The other textile materials named herein can be dyed by the same method as that described or by any other suitable method known for their coloration. Again, while our invention has been described more particularly in connection with the dyeing of cellulose acetate, it will be understood that our new compounds yield generally similar shades on the other non-vegetable textile materials named herein as they do on cellulose acetate. Lacquers can be colored by the method customarily employed for the coloration of such materials. The exact manner of dyeing or coloring, of course, constitutes no part of our invention.

It is here noted that the term "nylon" refers to a nuclear polyamide resin which is believed to be basically described or claimed in U. S. Letters Patent No. 2,071,250, issued February 16, 1937, to Wallace H. Carothers.

We claim:
1. The azo compounds having the formula:

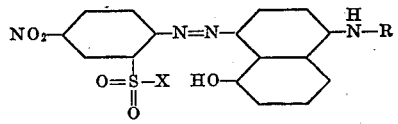

wherein X stands for a member selected from the group consisting of a low carbon open chain aliphatic group, the tetrahydrofurfuryl group, the 5-methyltetrahydrofurfuryl group and the 5-β-hydroxyethyltetrahydrofurfuryl group and R stands for a 2,3-dihydroxy-2-methyl-n-propyl group.

2. The azo compounds having the formula:

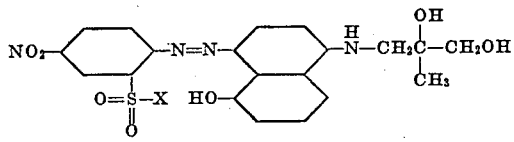

wherein X stands for a low carbon open chain aliphatic group.

3. The azo compound having the formula:

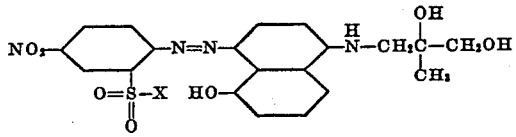

wherein X stands for the tetrahydrofurfuryl group.

4. The azo compounds having the formula:

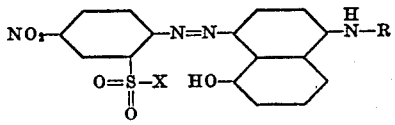

wherein X stands for a low carbon alkyl hydrocarbon group and R stands for a 2,3-dihydroxy-2-methyl-n-propyl group.

5. The azo compound having the formula:

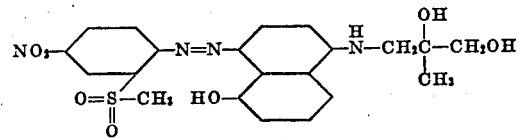

6. The azo compound having the formula:

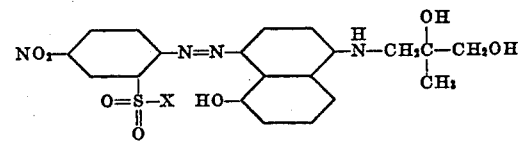

wherein X stands for the 5-methyltetrahydrofurfuryl group.

JOSEPH B. DICKEY.
JAMES G. McNALLY.

REFERENCES CITED

The following references are of record in the file of this patent:

UNITED STATES PATENTS

| Number | Name | Date |
| --- | --- | --- |
| 2,151,857 | Manz | Mar. 28, 1939 |
| 2,053,818 | Felix et al. | Sept. 8, 1936 |
| 2,053,817 | Felix et al. | Sept. 8, 1936 |